United States Patent
Hum et al.

(10) Patent No.: US 6,560,690 B2
(45) Date of Patent: May 6, 2003

(54) SYSTEM AND METHOD FOR EMPLOYING A GLOBAL BIT FOR PAGE SHARING IN A LINEAR-ADDRESSED CACHE

(75) Inventors: Herbert H. J. Hum, Portland, OR (US); Stephan J. Jourdan, Portland, OR (US); Deborrah Marr, Portland, OR (US); Per H. Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 09/753,330

(22) Filed: Dec. 29, 2000

(65) Prior Publication Data

US 2002/0087795 A1 Jul. 4, 2002

(51) Int. Cl.$^7$ .............................................. G06F 12/00
(52) U.S. Cl. .................... 711/210; 711/200; 711/202; 711/203; 711/204; 711/220
(58) Field of Search ................. 711/1, 2, 200, 711/202, 203–210, 220, 130

(56) References Cited

U.S. PATENT DOCUMENTS

| | | | | |
|---|---|---|---|---|
| 4,096,573 A | * | 6/1978 | Heller et al. | 711/207 |
| 4,136,385 A | * | 1/1979 | Gannon et al. | 711/207 |
| 5,276,829 A | * | 1/1994 | Sano | 711/210 |
| 5,319,761 A | * | 6/1994 | Chiarot et al. | 711/210 |
| 5,754,818 A | * | 5/1998 | Mohamed | 711/210 |
| 6,061,774 A | * | 5/2000 | Witek | 711/210 |
| 6,298,411 B1 | * | 10/2001 | Giacalone | 711/210 |
| 6,324,634 B1 | * | 11/2001 | Yoshioka et al. | 711/210 |
| 6,470,438 B1 | * | 10/2002 | McCormick, Jr. | 711/210 |

* cited by examiner

Primary Examiner—Matthew Kim
Assistant Examiner—Yamir Encarnacion
(74) Attorney, Agent, or Firm—Kenyon & Kenyon

(57) ABSTRACT

A system and method for storing only one copy of a data block that is shared by two or more processes is described. In one embodiment, a global/non-global predictor predicts whether a data block, specified by a linear address, is shared or not shared by two or more processes. If the data block is predicted to be non-shared, then a portion of the linear address referencing the data block is combined with a process identifier that is unique to form a global/non-global linear address. If the data block is predicted to be shared, then the global/non-global linear address is the linear address itself. If the prediction as to whether or not the data block is shared is incorrect, then the actual value of whether or not the data block is shared is used in computing a corrected global/non-global linear address. If the data referenced by either the global/non-global linear address that was predicted correctly or the corrected global/non-global linear address resides in the global/non-global linear-addressed cache memory, then that data block is accessed and transmitted to a requesting processor. If the data referenced by either the global/non-global linear address that was predicted correctly or the corrected global/non-global linear address does not reside in the global/non-global linear-addressed cache memory, then a cache line selected by a replacement policy has its data block replaced with a data block from a storage device at a higher hierarchical level as specified by the linear address.

30 Claims, 9 Drawing Sheets

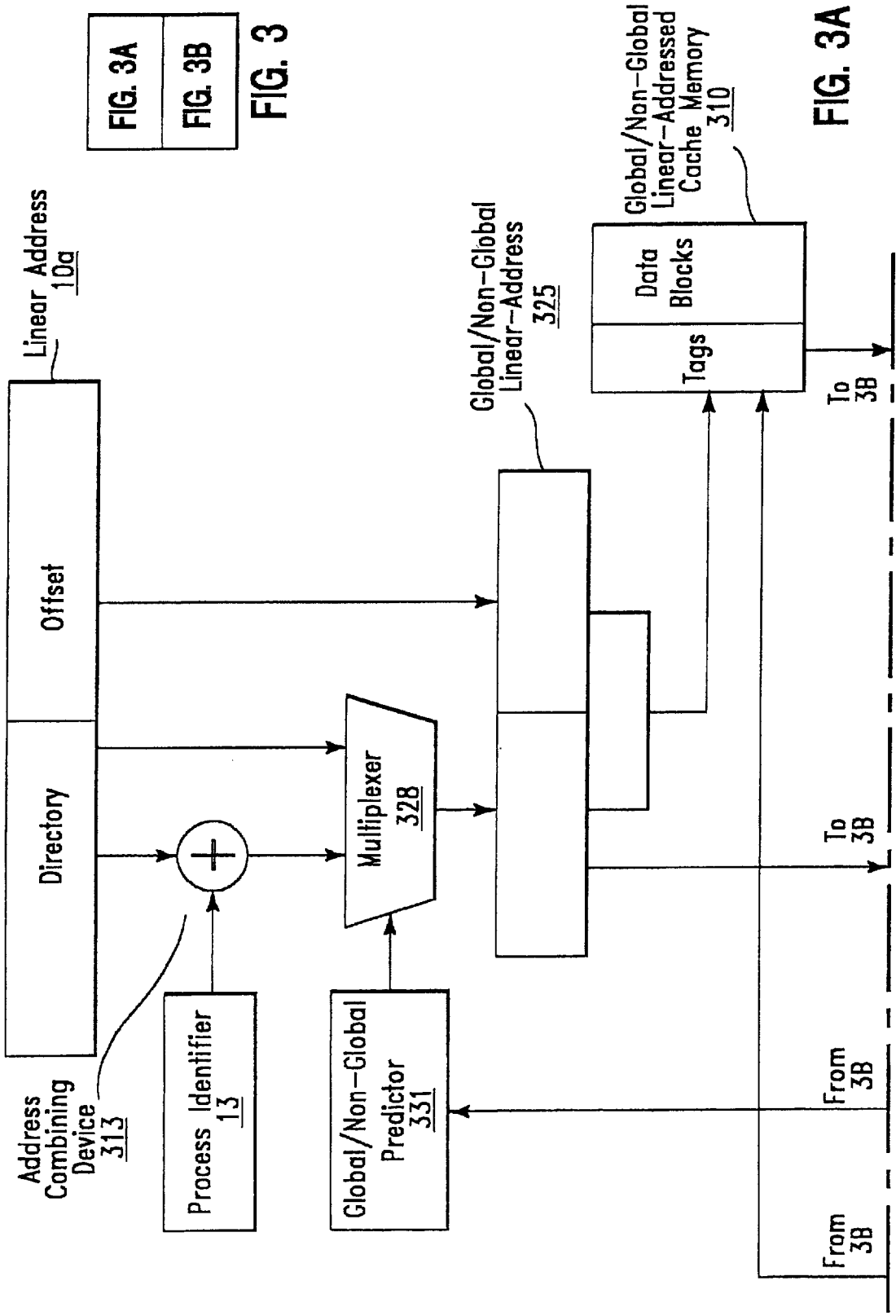

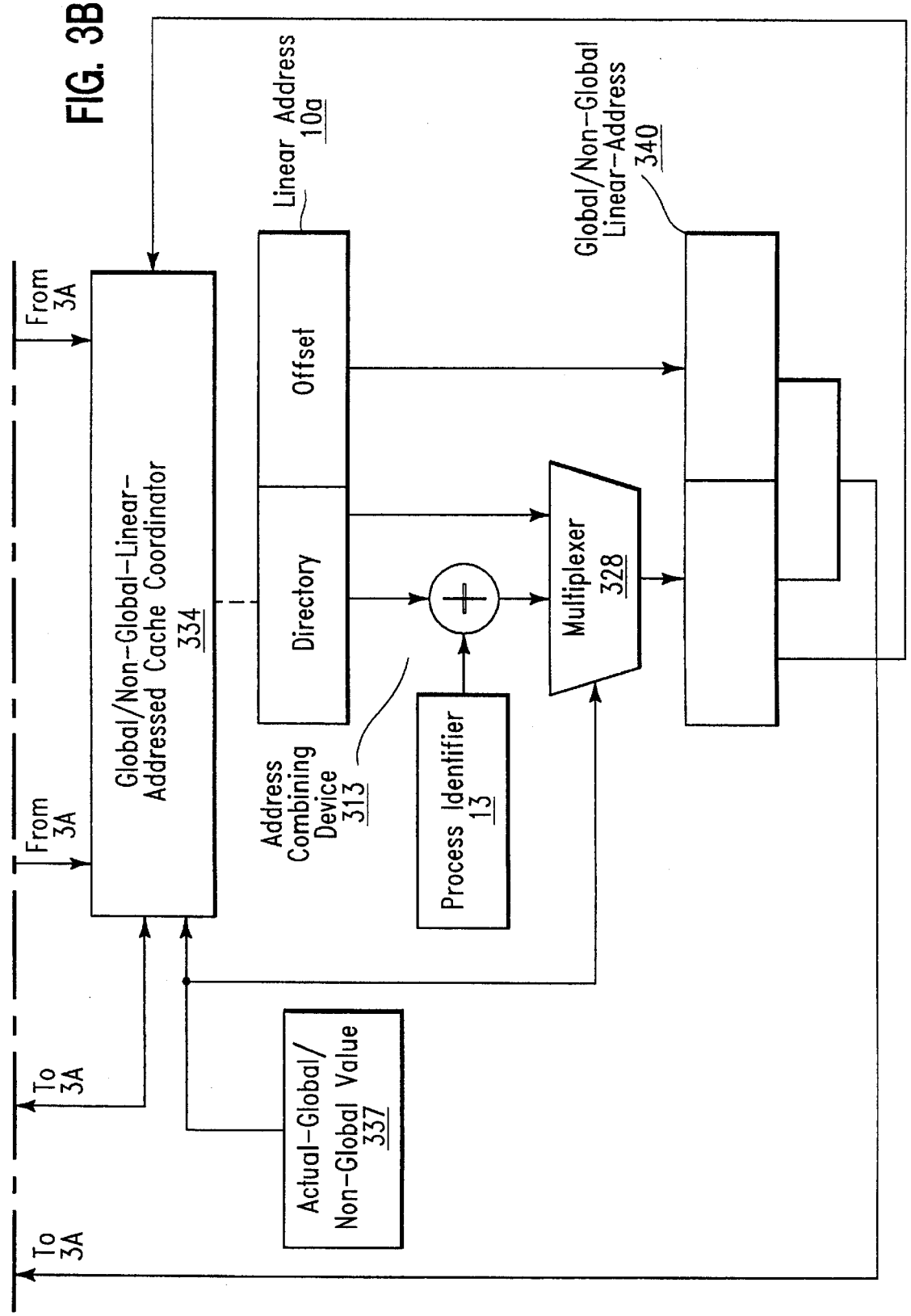

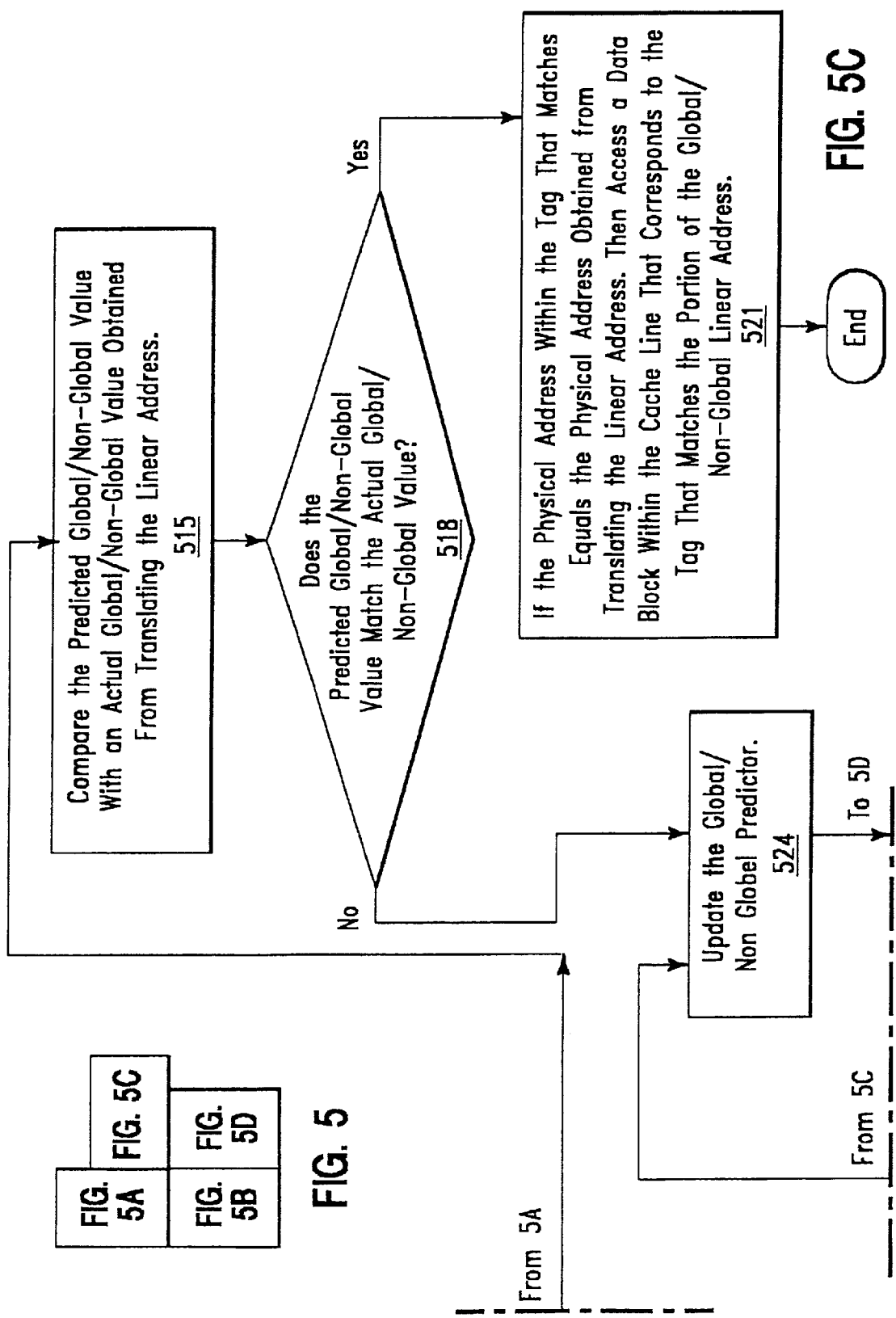

SYSTEM AND METHOD FOR EMPLOYING A GLOBAL BIT FOR PAGE SHARING IN A LINEAR-ADDRESSED CACHE

II. RELATED APPLICATIONS

This application is related to U.S. patent application having Ser. No. 10/104,815 filed on Mar. 22, 2002 and entitled: "Use of a Context Identifier in a Cache Memory," still pending.

BACKGROUND OF THE INVENTION

I. Field of the Invention

This invention relates generally to computer technology, and more particularly, to improving processor performance in a computer system.

II. Background Information

The use of a cache memory with a processor facilitates the reduction of memory access time. The cache memory may be configured, among others, as an instruction cache, a data cache, or a translation lookaside buffer (cache that stores recently used page-directory and page-table entries). The fundamental idea of cache organization is that by keeping the most frequently accessed instructions and data in the fast cache memory, the average memory access time will approach the access time of the cache. It is generally understood that memory devices closer to the processor operate faster than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

A virtual memory environment allows a large linear address space to be simulated with a small amount of physical memory (e.g., random access memory or read-only memory) and some disk storage. When a process references a logical address in memory, the processor translates the logical address into a linear address and then translates the linear address into a corresponding physical address. The physical address corresponds to a hardware memory location. A linear-to-physical address translation involves memory management hardware translating the linear address to the physical address. The linear-to-physical address translation is time consuming as it uses a memory access (e.g., the memory access may be to a cache or main memory) and waiting for this translation before performing an action (e.g., performing a cache lookup) increases the memory access time.

In order to decrease memory access time, a cache may be organized as a linear-addressed cache where the linear address of the memory request is used for the cache lookup rather than the physical address. The linear-addressed cache forgoes the linear-to-physical address translation before performing the cache lookup. Forgoing the linear-to-physical address translation decreases the memory access time. When using the linear-addressed cache, the linear-to-physical address translation is still performed because the physical address resulting from the translation is used to validate the data accessed in the cache using the linear address (i.e., check to ensure that the correct memory locations are accessed), but this linear-to-physical address translation is performed in parallel with the cache lookup. Performing the linear-to-physical address translation in parallel with the linear-addressed cache lookup improves the memory access time as the translation overhead is minimized due to the overlap with the linear-addressed cache lookup.

More than one process may execute on a processor. Typically, the linear-addressed cache is flushed when the processor switches from executing one process to executing another process. A cache flush occurs when the processor writes the valid and current information from its cache back into main memory. The cache flush diminishes processor performance as the processor may have to wait for completion of writes to the main memory. Moreover, data that would have been accessed after the cache flush that was in the cache before the flush now has to be brought back into the cache. Therefore, cache flushes are avoided whenever possible in order to increase processor performance.

If a cache flush is not performed whenever a process switch occurs, then the linear-addressed cache may suffer from linear address aliasing. Linear address aliasing occurs when two separate processes running on the processor accesses the same cache line but those linear addresses map to different physical addresses (e.g., process one accesses linear address A and process two accesses linear address A but linear address A maps to different physical addresses). When linear address aliasing occurs, if the physical address, generated by performing a linear-to-physical address translation of the linear address, does not match a physical address within the tag of the cache line whose tag matches the linear address, then a data block referenced by the linear address is brought into a linear-addressed cache from a storage device at a higher level in the memory hierarchy (e.g., main memory or the hard disk). This memory access (resulting from the linear address aliasing) to the slower storage device at the higher hierarchical level decreases processor performance.

In order to reduce linear address aliasing, a process identifier that is unique to a process can be combined with the linear address to form an adjusted linear address. By combining the process identifier that is unique with the linear address, the resulting adjusted linear address provides a high probability of no aliasing. However, treating all accesses to a linear-addressed cache the same by combining a process identifier that is unique with the linear address can lead to replication of a shared data block (i.e., two or more processes use a data block whose physical address is in shared memory space). Because cache memory reduces the memory access time, storing only unique data blocks (i.e., shared data blocks are stored only once in the linear-addressed cache memory) decreases the memory access time as more unique data blocks in the linear-addressed cache result in fewer cache misses; the cache miss results in an increase in memory access time because of the resulting access to a slower storage device at a higher level in the memory hierarchy. Because cache memory is expensive, duplicating shared data blocks in the linear-addressed cache memory is not cost-effective.

For the foregoing reasons, there is a need to differentiate between shared data blocks and non-shared data blocks and how the shared data blocks and the non-shared data blocks are accessed and stored in a linear-addressed cache that is configured to reduce the problem of linear address aliasing.

BRIEF DESCRIPTION OF THE DRAWINGS

FIGS. 3, 3A, and 3B cooperatively show a block diagram of a global/non-global-linear-addressed cache memory system according to an embodiment of the present invention.

FIGS. 5, 5A, 5B, 5C, and 5D cooperatively show a flowchart describing the process for accessing and replacing a cache line within the global/non-global-linear-addressed cache memory according to an embodiment of the present invention.

DETAILED DESCRIPTION

In linear-addressed caches that are configured to reduce linear address aliasing, more efficient utilization of limited cache memory occurs by not redundantly storing data blocks that are accessed by two or more processes. In order to prevent duplicate storage of a shared data block in a linear-addressed cache memory configured to reduce linear address aliasing, in an embodiment of the present invention, a value indicating whether the data block is shared or non-shared determines if the linear address referencing the data block is combined with a process identifier that is unique to a process. If the value indicates that the data block is non-shared, then a portion of the linear address referencing the data block is combined with a process identifier that is unique to form a global/non-global linear address. If the value indicates that the data block is shared, then the global/non-global linear address is the linear address itself. In this embodiment, it is assumed that data blocks shared among two or more processes have the same linear address, as is the case with operating systems running on an Intel Architecture 32-bit ("IA-32") architecture. The process identifier may be combined with the linear address by methods that include, among others, concatenating or hashing together the linear address and the process identifier.

A predictor is used to predict whether the linear address references a shared data block. The predictor is used because whether a data block is shared is not known until a linear-to-physical address translation is performed. This linear-to-physical address translation results in a memory access (e.g., the memory access may be to a cache or main memory) which is time consuming. Therefore, in order to avoid the delay and the corresponding increase in memory access time involved in the translation, the prediction as to whether the data block is shared or non-shared is used in forming the global/non-global linear address. The tags of the linear-addressed cache memory are searched using the predicted global/non-global linear address. In the midst of the linear-to-physical address translation, the actual global/non-global value is known and this value is compared to the predicted global/non-global value. If the prediction was incorrect, then the actual global/non-global value is used to form a corrected-global/non-global-linear address and perform the cache search again using the corrected-global/non-global-linear address.

Figure 1:
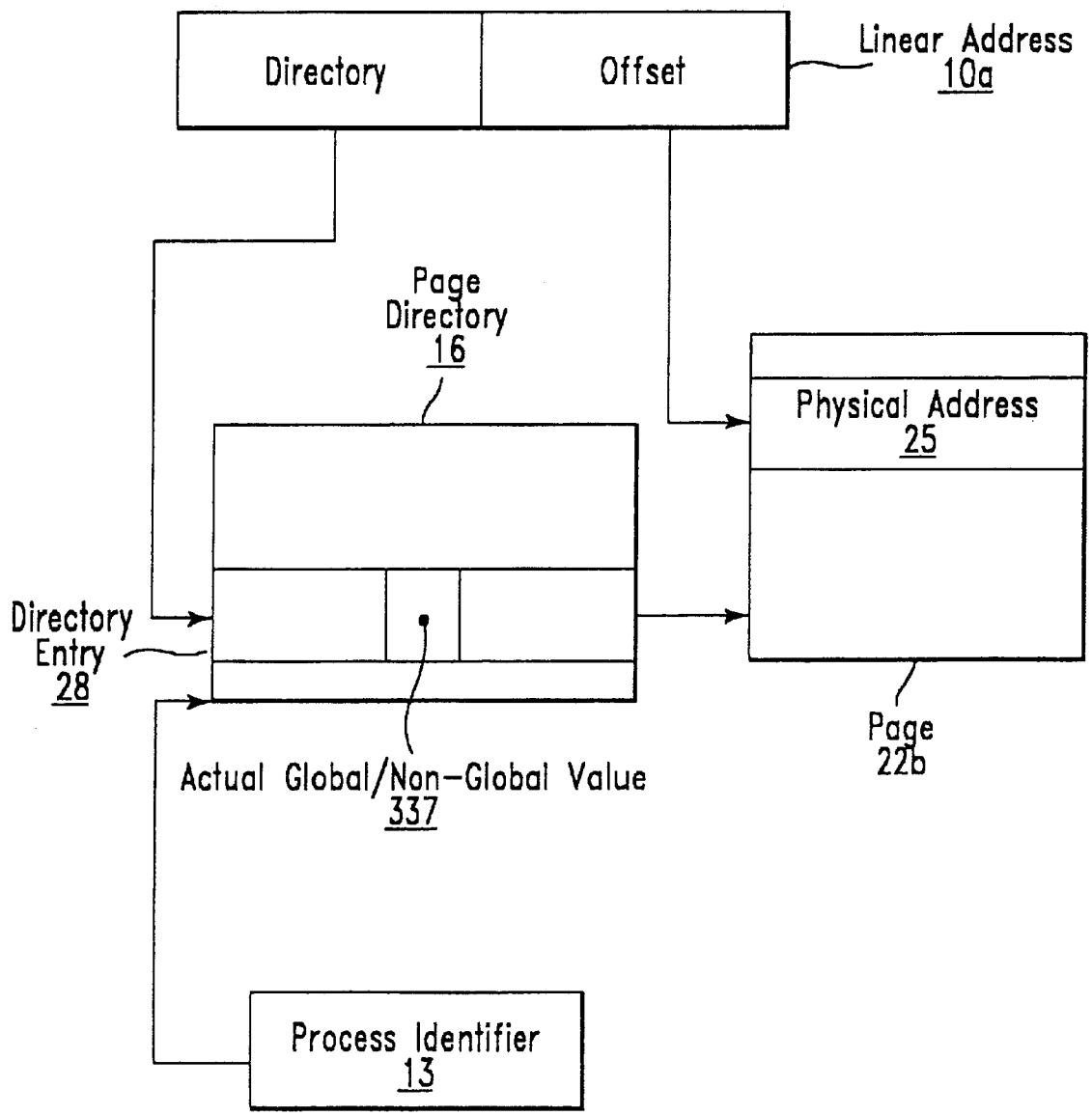
FIG. 1 shows a linear-to-physical address translation in which a page table is not used to obtain the physical address.

FIG. 1 shows a linear-to-physical address translation in which a page table is not used to obtain the physical address. Here, a process identifier 13 (e.g., a page directory base pointer) holds the base physical address for a page directory 16. Each process has a unique page directory 16. Each process also has a unique process identifier 13. Process identifier 13 is used to access page directory 16. The directory field of a linear address 10a provides an offset to a directory entry 28. Directory entry 28 includes an actual global/non-global value 337 that indicates whether the data block (e.g., a page 22a) is shared among two or more processes. For example, if actual global/non-global value 337 has a value of "1", then the data block is shared among two or more processes, but, if the actual global/non-global value 337 has a value of "0", then the data block is not shared. Directory entry 28 provides a base physical address for a page 22b. The offset field of linear address 10a provides an offset to a physical address 25 within page 22b.

Figure 2:
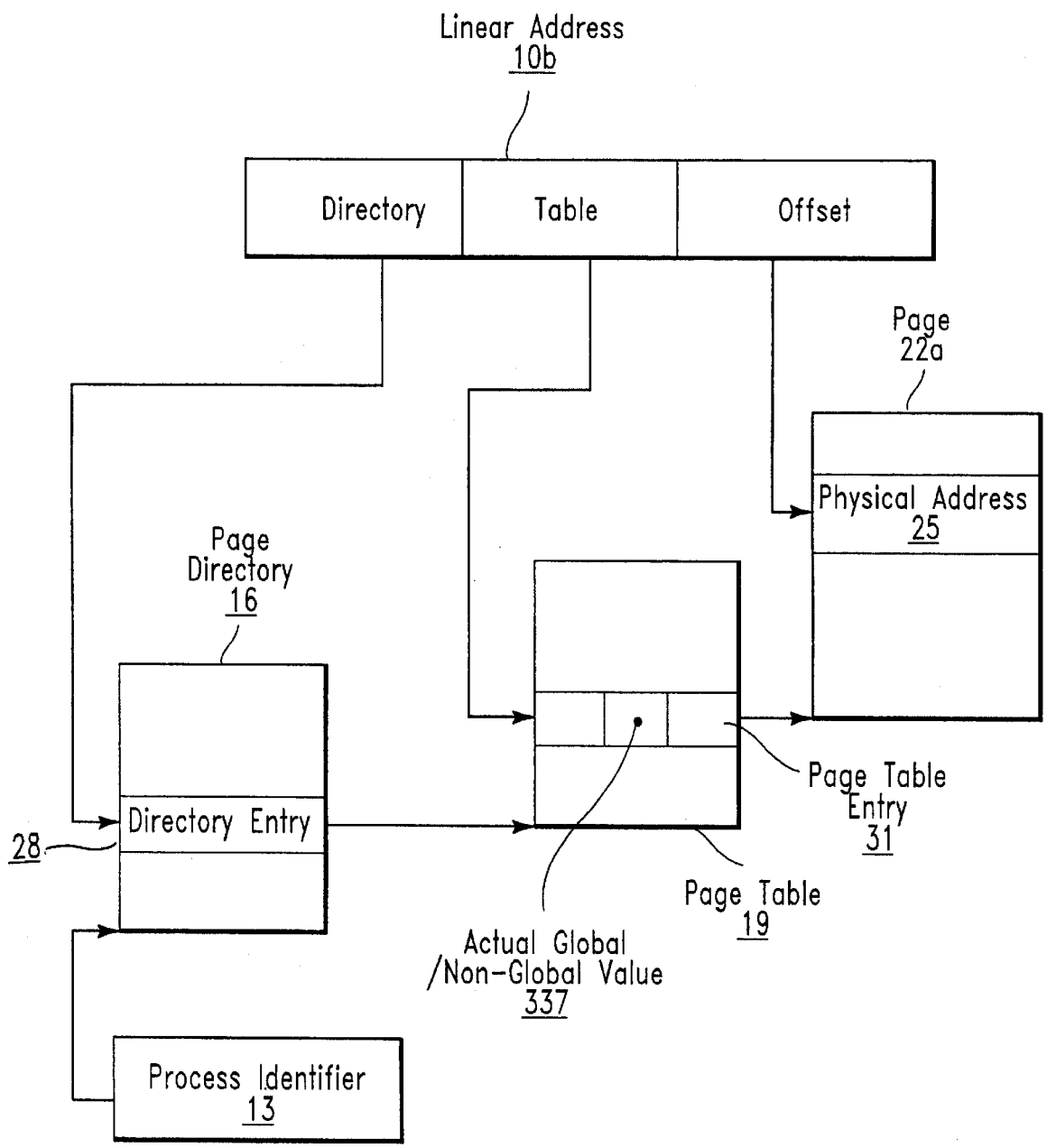
FIG. 2 shows a linear-to-physical address translation in which a page table is used to obtain the physical address.

FIG. 2 shows a linear-to-physical address translation in which a page table is used to obtain the physical address. Here, process identifier 13 is used to access page directory 16. A directory field of a linear address 10b provides an offset to directory entry 28 in page directory 16. Directory entry 28 provides a base physical address of a page table 19. A table field of linear address 10b provides an offset to a page-table entry 31. Page-table entry 31 includes actual global/non-global value 337 that indicates whether the data block (e.g., a page 22b) is shared among two or more processes. For example, if actual global/non-global value 337 has a value of "1", then the data block is shared among two or more processes, but, if the actual global/non-global value 337 has a value of "0", then the data block is not shared. Page-table entry 31 provides a base physical address of a page 22a The offset field of linear address 10b provides an offset to physical address 25 within page 22a.

FIG. 3 shows a block diagram of a global/non-global-linear-addressed cache memory system according to an embodiment of the present invention. In this embodiment, address combining device 313 combines a portion of linear address 10a, e.g., the directory field, with a process identifier 13 and this combination is input into a multiplexing device such as multiplexer 328. The portion of linear address 10a (e.g., the directory field) is also input directly into multiplexer 328. Multiplexer 328 is used to select one of the two inputs as an output, the selection based on a value provided by a global/non-global predictor 331.

Global/non-global predictor 331, coupled to multiplexer 328, predicts whether the data block referenced by linear address 10a is shared or non-shared among two or more processes. Global/non-global predictor 331 may be a saturating counter, i.e., a counter limited to a value of either binary "0" or binary "1". The value "0" may indicate that the data block is non-shared, and the value "1" may indicate that the data block is shared. Actual global/non-global value 337 is found during the linear-to-physical address translation and if this value indicates that the data block is non-shared, then the saturating counter is decremented to "0". In this case, for the next cache memory lookup, global/non-global predictor 331 predicts that the cache memory lookup references a non-shared data block since the saturating counter has a value "0". If during the linear-to-physical address translation, this prediction is found to be incorrect, then the saturating counter is incremented to "1". In this case, for the next cache memory lookup, global/non-global predictor 331 predicts that the cache memory lookup references a shared data block. In addition to the saturating counter, global/non-global predictor 331 may be, among others, a two-bit scheme where the prediction must miss twice before it is changed. Global/non-global predictor 331 may also be a history array.

If global/non-global predictor 331 predicts that the data block is shared, then multiplexer 328 selects as its output a portion of linear address 10a (e.g., the directory field) that is directly input into multiplexer 328, and this output forms a portion of global/non-global linear address 325. If, however, global/non-global predictor 331 predicts that the data block is not shared, then multiplexer 328 selects as its output the combination of the portion of linear address 10a (e.g., the directory field) with process identifier 13, and this output forms the portion of global/non-global linear address 325.

The remaining portion of global/non-global linear address 325 is formed using the offset field of linear address 10a.

A global/non-global-linear-addressed cache memory 310 is coupled to multiplexer 328. Global/non-global-linear-addressed cache memory 310 includes cache lines, and each of the cache lines includes a tag and a data block.

A global/non-global-linear-addressed cache coordinator 334 is coupled to global/non-global-linear-addressed cache memory 310. Global/non-global-linear-addressed cache coordinator 334 compares a portion of global/non-global linear address 325 to each of the tags of global/non-global-linear-addressed cache memory 310 to determine if any of the tags match. If one of the tags match, then the prediction by global/non-global predictor 331 ("predicted global/non-global value") is compared to actual-global/non-global value 337 which is found as shown in FIG. 1. If the prediction was correct and the physical address within the tag that matches equals the physical address obtained from translating linear address 10a, then the data block corresponding to the cache line whose tag matches is accessed and this data block is transmitted to a requesting processor.

If none of the tags match the portion of global/non-global linear address 325, and the prediction by global/non-global predictor 331 is correct, then a replacement policy selects one of the cache lines for replacement and the data block of that cache line is replaced with a data block from a storage device as specified by a physical address generated by translating linear address 10a. The tag for the selected cache line is a portion of global/non-global linear address 325 and physical address 25 generated by the linear-to-physical address translation of linear address 10a.

If global/non-global-linear-addressed cache coordinator 334 finds that the predicted global/non-global value does not match actual-global/non-global value 337, then global/non-global-linear-addressed cache coordinator 334 updates global/non-global predictor 331. For example, if global/non-global predictor 331 is the saturating counter and has the value "0", then global/non-global predictor 331 is set to "1". Also, a corrected-global/non-global linear address 340 is formed using actual-global/non-global value 337 that is generated by performing the linear-to-physical address translation shown in FIG. 1.

Address combining device 313 combines a portion of linear address 10a (e.g., the directory field) with a process identifier 13 and this combination is input into multiplexer 328. A portion of linear address 10a (e.g., the directory field) is also input directly into multiplexer 328. If actual-global/non-global value 337 indicates that the data block is shared, then multiplexer 328 selects as its output the portion of linear address 10a (e.g., the directory field) that was directly input, and this output forms a portion of corrected-global/non-global linear address 340. If, however, actual-global/non-global value 337 indicates that the data block is not shared, then multiplexer 328 selects as its output the combination of the portion of linear address 10a with process identifier 13, and this output forms the portion of corrected-global/non-global linear address 340. The remaining portion of corrected-global/non-global linear address 340 is formed using the offset field of linear address 10a.

Global/non-global-linear-addressed cache-coordinator 334 compares the portion of corrected-global/non-global linear address 340 with each of the tags of global/non-global-linear-addressed cache memory 310 to determine if any of the tags match. If one of the tags match and the physical address within the tag that matches equals the physical address obtained from translating linear address 10a, then the data block corresponding to the cache line whose tag matches is accessed and this data block is transmitted to a requesting processor.

If none of the tags match the portion of the corrected-global/non-global linear address 340, then a replacement policy selects one of the cache lines for replacement and the data block of that cache line is replaced with a data block from a storage device as specified by a physical address generated by translating linear address 10a. The tag for the selected cache line is a portion of corrected-global/non-global linear address 325 and physical address 25 generated by the linear-to-physical address translation of linear address 10a.

Figure 4:
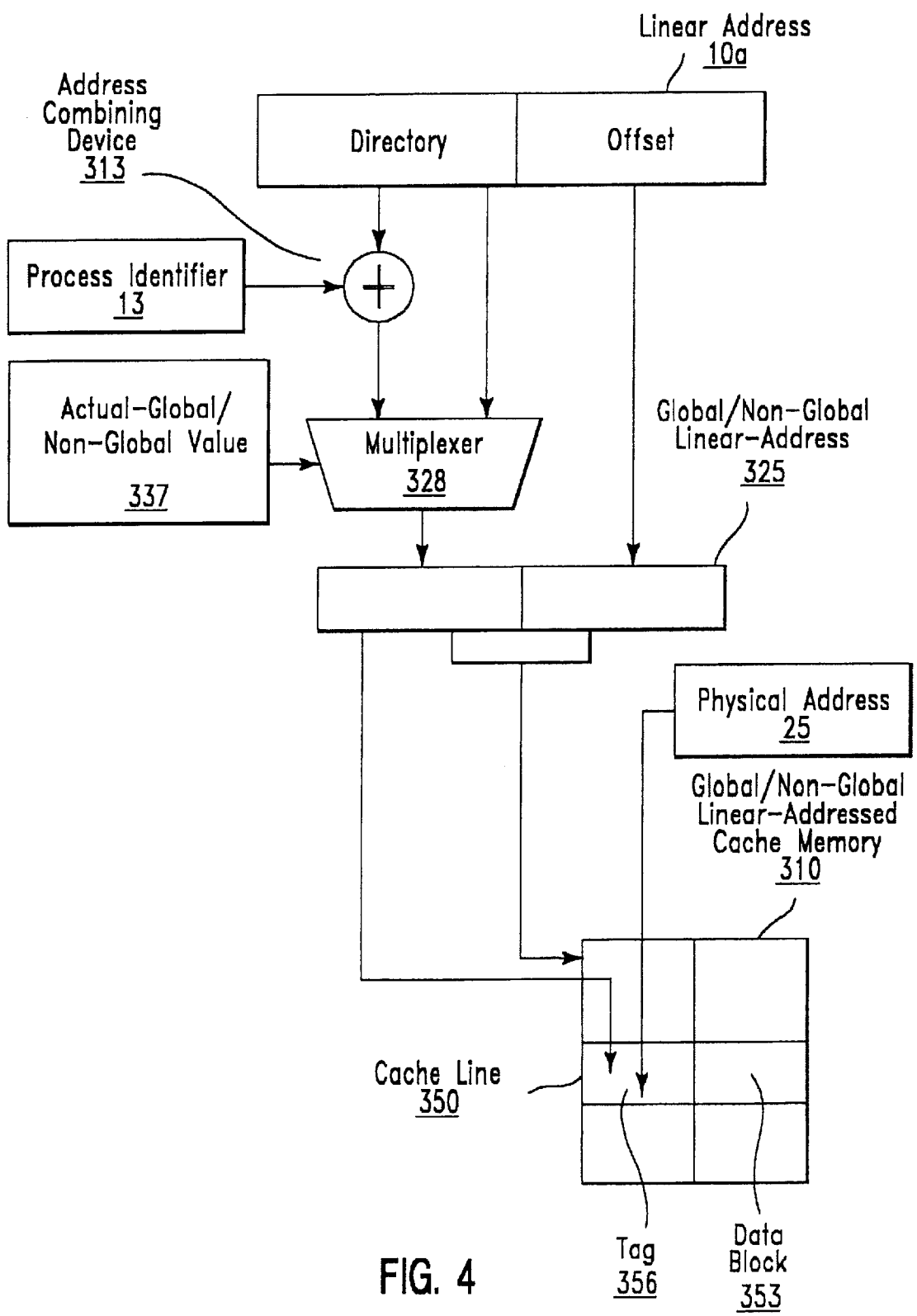
FIG. 4 shows a block diagram of a global/non-global-linear-addressed cache memory replacing system according to an embodiment of the present invention.

FIG. 4 shows a block diagram of a global/non-global-linear-addressed cache memory replacing system according to an embodiment of the present invention. In this embodiment, if the data block referenced by linear address 10a does not reside in global/non-global-linear-addressed cache memory 310, then one of the cache lines, as selected by a replacement policy, is replaced with an appropriate data block fetched from a storage device at a higher hierarchical level, and the tag for this cache line is set accordingly. If a cache line 350 is to be replaced, then for cache line 350, a tag 356 is generated and a data block 353 is fetched from the storage device at the higher hierarchical level.

Tag 356 includes physical address 25 which is found by performing the linear-to-physical address translation of linear address 10a as described earlier in FIG. 1. Tag 356 also includes a portion of global/non-global linear address 325. Global/non-global linear address 325 is formed by address combining device 313 combining a portion of linear address 10a (e.g., the directory field) with a process identifier 13 and this combination is input into multiplexer 328. A portion of linear address 10a (e.g., the directory field) is also input directly into multiplexer 328. If actual-global/non-global value 337 indicates that the data block is shared, then multiplexer 328 selects as its output the portion of linear address 10a (e.g., the directory field) that was directly input, and this output forms a portion of global/non-global linear address 325. If, however, actual-global/non-global value 337 indicates that the data block is not shared, then multiplexer 328 selects as its output the combination of the portion of linear address 10a with process identifier 13, and this output forms the portion of global/non-global linear address 325. The remaining portion of global/non-global linear address 325 is formed using the offset field of linear address 10a.

Data block 353 is the data block referenced by linear address 10a and because this data block did not previously reside in global/non-global-linear-addressed cache memory 310, it is fetched, using physical address 25, from a storage device at a higher level in the memory hierarchy.

Figure 5A:
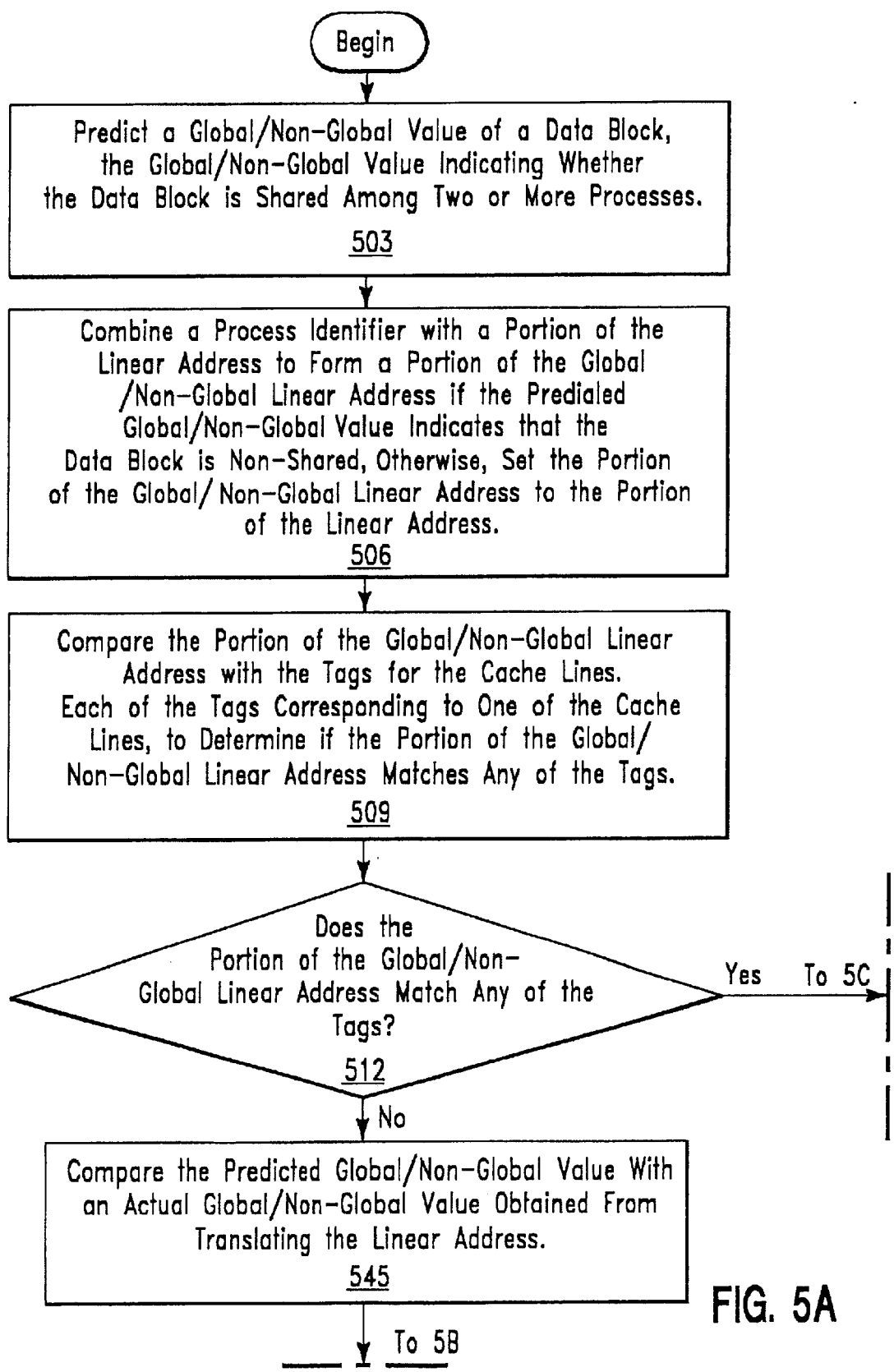
Figure 5B:
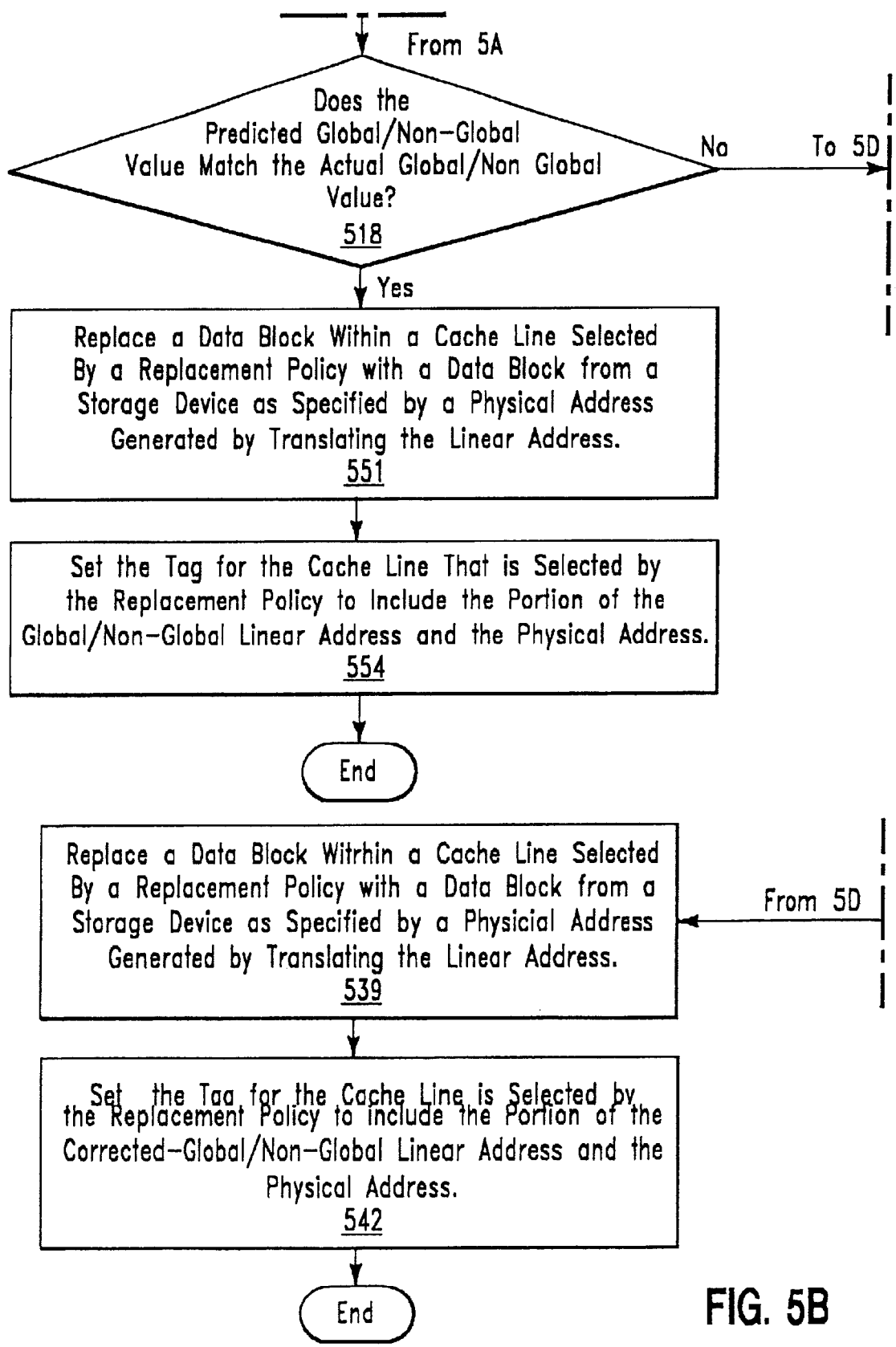
Figure 5D:
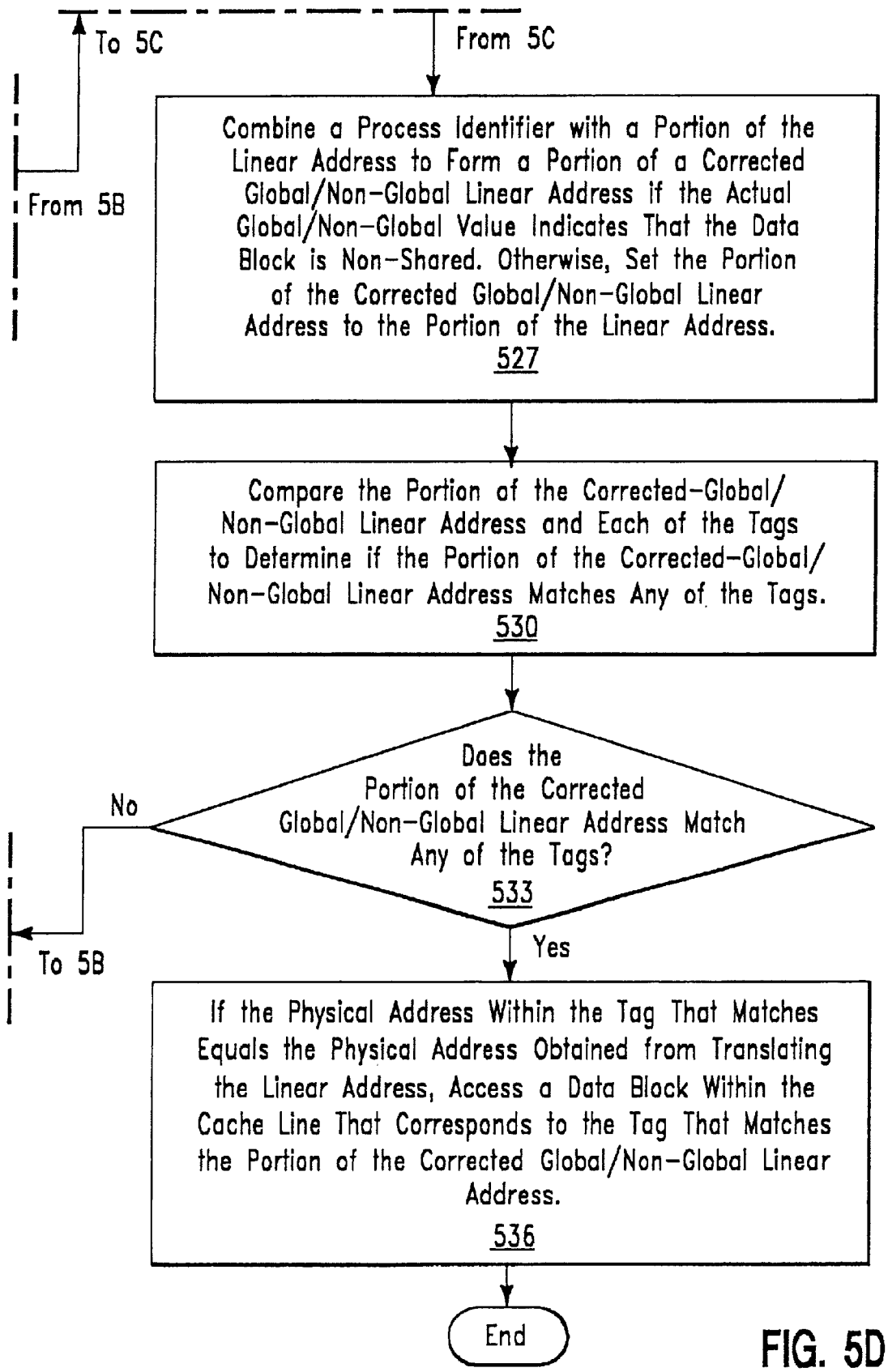

FIG. 5 shows a flowchart describing the process for accessing and replacing a cache line within global/non-global-linear-addressed cache memory 310 according to an embodiment of the present invention. In this embodiment, in block 503, a global/non-global value of a data block is predicted; the predicted global/non-global value is a prediction as to whether the data block referenced by linear address 10a is shared among two or more processes. In block 506, a portion of global/non-global linear address 325 is formed by combining process identifier 13 with a portion of linear address 10a (e.g., the directory field) if the predicted global/non-global value indicates that the data block is non-shared, otherwise, the portion of global/non-global linear address 325 is set to the portion of linear address 10a (e.g., the directory field). The remaining portion of global/non-global linear address 325 is formed using the offset field of linear address 10*a*.

In block 509, the portion of global/non-global linear address 325 is compared with each of the tags, each of the tags correspond to each of the cache lines of global/non-global-linear-addressed cache memory 310, to determine if the portion of global/non-global linear address 325 matches any of the tags. In conditional block 512, it is determined whether the portion of global/non-global linear address 325 matches any tags. If one of the tags match the portion of global/non-global linear address 325, then in block 515, the predicted global/non-global value is compared with actual global/non-global value 337 obtained from translating linear address 10*a*. In conditional block 518, it is determined if the predicted global/non-global value matches actual global/non-global value 337.

If the predicted global/non-global value matches actual global/non-global value 337, then in block 521, if the physical address within the tag that matches equals physical address 25 obtained from translating linear address 10*a*, then a data block within the cache line corresponding to the tag that matches the portion of global/non-global linear address 325 is accessed and that data block is delivered to a processor.

If the predicted global/non-global value does not match actual global/non-global value 337, then in block 524, global/non-global predictor 331 is updated accordingly. For example, if global/non-global predictor 331 is a saturating counter that predicted that the data block is shared, but the data block is in fact not shared, then the saturating counter is updated to predict, for the next prediction, that the data block is not shared. In block 527, process identifier 13 and the portion of linear address 10*a* (e.g., the directory field) are combined to form a portion of corrected-global/non-global linear address 340 if actual global/non-global value 337 indicates that the data block is non-shared among two or more processes, otherwise, the portion of the corrected-global/non-global linear address 340 is set to the portion of linear address 10*a*. The remaining portion of corrected-global/non-global linear address 340 is formed using the offset field of linear address 10*a*.

In block 530, the portion of corrected-global/non-global linear address 340 is compared to each of the tags to determine if the portion of corrected-global/non-global linear address 340 matches any of the tags. In conditional block 533, it is determined if the portion of corrected-global/non-global linear address 340 matches any of the tags. If the portion of corrected-global/non-global linear address 340 matches any of the tags, then in block 536, if the physical address within the tag that matches equals physical address 25 obtained from translating linear address 10*a*, then a data block within the cache line that corresponds to the tag that matches the portion of corrected-global/non-global linear address 340 is accessed and this data is delivered to the processor. If the portion of corrected-global/non-global linear address 340 does not match any of the tags, then in block 539, a data block within a cache line selected by a replacement policy is replaced with a data block from a storage device as specified by physical address 25 generated by performing the linear-to-physical address translation of linear address 10*a*. In block 542, the tag for the selected cache line includes the portion of corrected-global/non-global linear address 340 and physical address 25 generated by translating linear address 10*a*.

If the portion of global/non-global linear address 325 does not match any of the tags, then in block 545, the predicted global/non-global value is compared with actual global/non-global value 337 obtained from translating linear address 10*a*. In conditional block 518, it is determined if the predicted global/non-global value matches actual global/non-global value 337. If the predicted global/non-global value matches actual global/non-global value 337, then in block 551, a data block within a cache line that is selected by a replacement policy is replaced with a data block from a storage device as specified by physical address 25 generated by translating linear address 10*a*. In block 554, the tag for the selected cache line is set to include the portion of global/non-global linear address 325 and physical address 25. If the predicted global/non-global value does not match actual global/non-global value 337, then the actions starting with block 524 are performed as described earlier.

Although unlikely, linear address aliasing may still exist when the process identifier is combined with the linear address, and thus the replacement policy provides memory coherency. This memory coherency may be done by, among others, the following strategies: (1) ensuring that only one copy of a data block is present in the cache at a given time (i.e., remove duplicate data blocks mapping to the same physical address); (2) invalidating duplicate copies of data blocks on a write (i.e., remove duplicate data blocks if one of the data blocks is modified); and (3) update all copies of data blocks when one of the data blocks is written.

In an alternative embodiment, global/non-global predictor 331 is not used to predict whether a data block referenced by the linear address is shared and thus whether or not the linear address is combined with a process identifier. Rather, actual-global/non-global value 337 is used in determining whether or not the linear address is combined with process identifier 13. In this embodiment, actual-global/non-global value 337 is obtained in the midst of the linear-to-physical address translation and thus because it's not immediately available, the linear address is used to index the linear-addressed cache. Actual-global/non-global value 337 is used to determine whether or not the linear address is combined with process identifier 13 to form an adjusted linear address or whether merely the linear address is used for the first tag match. If actual-global/non-global value 337 specifies that the data block is shared, then merely the linear address is used in the first tag match. If actual-global/non-global value 337 specifies that the data block is non-shared, then the linear address is combined with process identifier 13 to form an adjusted-linear address.

A tag for each of the cache lines in linear-addressed cache includes a physical address of the data block within the cache line, and also a linear address or an adjusted-linear address depending on whether the data block is shared. For the first tag match, the linear address or the adjusted-linear address formed by using actual-global/non-global value 337 is compared to the linear address or adjusted-linear address stored within the tag of the cache line that was indexed by the linear address. If these two addresses do not match, then the data block referenced by the linear address does not reside in the linear-addressed cache and thus must be fetched from the storage device at the higher level in the memory hierarchy. If the two addresses do match, however, then the physical address stored within the tag is compared to the physical address obtained from performing the linear-to-physical address translation. If these two addresses do not match, then the data block referenced by the linear address does not reside in the linear-addressed cache and thus must be fetched from the storage device at the higher level in the memory hierarchy. If the two addresses do match, however, then the data block referenced by the linear address does reside in the linear-addressed cache and is sent to the processor for processing.

In alternative embodiments, linear address 10b is used rather than linear address 10a, and in this case, the directory field of linear address 10b is combined with page directory base pointer 13 to form a portion of adjusted-linear address 325. The table field and the offset field of linear address 10b are the remaining portions of adjusted-linear address 325. In other embodiments, fields, other than the directory field, or all of the linear address is combined with process identifier 13 to form the adjusted-linear address, the global/non-global linear address, or the corrected-global/non-global linear address. Embodiments of the present invention are not limited to combining linear addresses having the format of linear address 10a or linear address 10b, but rather, linear addresses of any format can be combined with process identifier 13 to form the adjusted-linear address, the global/non-global linear address, or the corrected-global/non-global linear address. Also, the tag for each of the cache lines may include all or a portion of the linear address, the adjusted-linear address, the global/non-global linear address, or the corrected-global/non-global linear address. Therefore, all or a portion of the linear address, the adjusted-linear address, the global/non-global linear address, or the corrected-global/non-global linear address is used for the tag matching.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A method for accessing a particular one of at least one cache line, referenced by a linear address, in an global/non-global-linear-addressed cache memory, comprising:
    predicting a global/non-global value of a data block referenced by the linear address, the global/non-global value indicating whether the data block is shared among a plurality of processes;
    combining a process identifier with the linear address to form the global/non-global linear address if the predicted global/non-global value indicates that the data block is non-shared, otherwise, setting the global/non-global linear address to the linear address; and
    comparing the global/non-global linear address with each of at least one tag, each of the at least one tag corresponding to each of the at least one cache line, to determine if the global/non-global linear address matches any of the at least one tag.

2. The method of claim 1, further comprising:
    if the global/non-global linear address matches a particular one of the at least one tag,
        comparing the predicted global/non-global value with an actual global/non-global value obtained from translating the linear address;
        if the predicted global/non-global value matches the actual global/non-global value and if a first physical address within the particular one of the at least one tag that matches equals a second physical address generated by translating the linear address, accessing a data block within a particular one of the at least one cache line corresponding to the particular one of the at least one tag that matches,
        otherwise,
            updating a global/non-global predictor;
            combining the process identifier and the linear address to form a corrected-global/non-global linear address if the actual global/non-global value indicates that the data block is non-shared, otherwise, setting the corrected-global/non-global linear address to the linear address;
            comparing the corrected-global/non-global linear address with each of the at least one tag to determine if the corrected-global/non-global linear address matches any of the at least one tag;
            if the corrected-global/non-global linear address matches a particular one of the at least one tag and if the first physical address equals the second physical address, accessing a data block within a particular one of the at least one cache line that corresponds to the particular one of the at least one tag that matches; and
            if the corrected-global/non-global linear address does not match any of the at least one tag, replacing a data block within a particular one of the at least one cache line that is selected by a replacement policy with a data block from a storage device as specified by the second physical address, wherein the tag corresponding to the particular one of the at least one cache line that is selected includes the corrected-global/non-global linear address and the second physical address.

3. The method of claim 2, further comprising:
    if the global/non-global linear address does not match any of the at least one tag,
    comparing the predicted global/non-global value with an actual global/non-global value obtained from translating the linear address;
        if the predicted global/non-global value matches the actual global/non-global value, replacing a data block within a particular one of the at least one cache line that is selected by a replacement policy with a data block from a storage device as specified by the second physical address, wherein the tag for the particular one of the at least one cache line that is selected includes the global/non-global linear address and the physical address,
        otherwise,
            updating the global/non-global predictor;
            combining the process identifier and the linear address to form a corrected-global/non-global linear address if the actual global/non-global value indicates that the data block is non-shared, otherwise, setting the corrected-global/non-global linear address to the linear address;
            comparing the corrected-global/non-global linear address with each of the at least one tag to determine if the corrected-global/non-global linear address matches any of the at least one tag;
            if the corrected-global/non-global linear address matches a particular one of the at least one tag and if the first physical address equals the second physical address, accessing a data block within a particular one of the at least one cache line that corresponds to the particular one of the at least one tag that matches; and
            if the corrected-global/non-global linear address does not match any of the at least one tag and, replacing a data block within a particular one of the at least one cache line that is selected by a replacement policy with a data block from a storage device as specified by the second physical address, wherein the tag corresponding to the particular one of the at least one cache line that is selected includes the corrected-global/non-global linear address and the second physical address.

4. The method of claim 1, wherein the global/non-global predictor is at least one of a saturating counter and a history array.

5. The method of claim 1, wherein the process identifier is a page directory base pointer that is a physical address of a base of a page directory.

6. The method of claim 3, wherein the actual global/non-global value is found in a directory entry, specified by the linear address, of a page directory.

7. The method of claim 3, wherein the actual global/non-global value is found in a page-table entry, specified by the linear address, of a page table.

8. The method of claim 1, wherein combining the process identifier with the linear address includes hashing together the process identifier with the linear address or concatenating together the process identifier with the linear address.

9. The method of claim 8, wherein at least one of the process identifier is a portion of the process identifier, and the linear address is a portion of the linear address.

10. The method of claim 3, wherein a portion of the global/non-global linear address is compared with each of the at least one tag, each of the at least one tag includes a corresponding portion of the global/non-global linear address.

11. The method of claim 3, wherein a portion of the corrected-global/non-global linear address is compared with each of the at least one tag, each of the at least one tag includes a corresponding portion of the corrected-global/non-global linear address.

12. A system, comprising:
   a global/non-global predictor that predicts a global/non-global value of a data block referenced by a linear address, the global/non-global value indicates whether the data block is shared among a plurality of processes;
   a first multiplexer, coupled to the global/non-global predictor, that selects the linear address as a global/non-global linear address if the predicted global/non-global value indicates that data block is shared, and selects a process identifier combined with the linear address as the global/non-global linear address if the predicted global/non-global value indicates that the data block is non-shared; and
   a global/non-global linear-address cache coordinator, coupled to the first multiplexer and the global/non-global predictor, to compare the global/non-global linear-address with each of at least one tag to determine if the global/non-global linear address matches a particular one of the at least one tag, each of the at least one tag corresponds to each of at least one cache line in a global/non-global linear addressed cache memory.

13. The system of claim 12, wherein the global/non-global linear-address cache coordinator,
   if the global/non-global linear address matches the particular one of the at least one tag,
      compares the predicted global/non-global value with an actual global/non-global value obtained from translating the linear address; and
      if the predicted global/non-global value matches the actual global/non-global value and if a first physical address within the particular one of the at least one tag that matches equals a second physical address generated by translating the linear address, accesses a data block within a particular one of the at least one cache line corresponding to the particular one of the at least one tag that matches,
      otherwise,
         updates the predicted global/non-global value in the global/non-global predictor with the actual global/non-global value,
   otherwise,
      compares the predicted global/non-global value with the actual global/non-global value; and
      if the predicted global/non-global value matches the actual global/non-global value, replaces a data block within a particular one of the at least one cache line that is selected by a replacement policy with a data block from a storage device as specified by the second physical address,
      wherein the tag corresponding to the particular one of the at least one cache line that is selected includes the global/non-global linear address and the second physical address,
      otherwise,
         updates the predicted global/non-global value in the global/non-global predictor with the actual global/non-global value.

14. The system of claim 13, further comprising a second multiplexer, coupled to the global/non-global linear-address cache coordinator, that, if the predicted global/non-global value does not match the actual global/non-global value, selects the linear address as a corrected-global/non-global linear address if the actual global/non-global value indicates that the data block is shared, and selects the process identifier combined with the linear address as the corrected-global/non-global linear address if the actual global/non-global value indicates that the data block is non-shared.

15. The system of claim 14, wherein the global/non-global-linear-addressed cache coordinator,
   if the predicted global/non-global value does not match the actual global/non-global value,
      compares the corrected-global/non-global linear address with each of the at least one tag to determine if the corrected-global/non-global linear address matches a particular one of the at least one tag;
      if the corrected-global/non-global linear address matches the particular one of the at least one tag and if the first physical address equals the second physical address, accesses a data block within a particular one of the at least one cache line that corresponds to the particular one of the at least one tag that matches; and
      if the corrected-global/non-global linear address does not match any of the at least one tag, replaces a data block within a particular one of the at least one cache line that is selected by the replacement policy with a data block from the storage device as specified by the second physical address,
      wherein the tag corresponding to the particular one of the at least one cache line that is selected includes the corrected-global/non-global linear address and the second physical address.

16. The system of claim 12, wherein the global/non-global predictor is at least one of a saturating counter or a history array.

17. The system of claim 12, wherein the process identifier is a page directory base pointer that is a physical address of a base of a page directory.

18. The system of claim 13, wherein the actual global/non-global value is found in a directory entry, specified by the linear address, of a page directory.

19. The system of claim 13, wherein the actual global/non-global value is found in a page-table entry, specified by the linear address, of a page table.

20. The system of claim 14, wherein the process identifier combined with the linear address includes the process identifier hashed with the linear address or the process identifier concatenated with the linear address.

21. The system of claim 20, wherein at least one of the process identifier is a portion of the process identifier, and the linear address is a portion of the linear address.

22. The system of claim 12, wherein a portion of the global/non-global linear address is compared with each of the at least one tag, each of the at least one tag includes a corresponding portion of the global/non-global linear address.

23. The system of claim 15, wherein a portion of the corrected-global/non-global linear address is compared with each of the at least one tag, each of the at least one tag includes a corresponding portion of the corrected-global/non-global linear address.

24. A method for accessing a particular one of at least one cache line in a linear-addressed cache memory corresponding to a linear address, comprising:
    indexing a particular one of the at least one cache line referenced by the linear address;
    retrieving an actual global/non-global value obtained by translating the linear address;
    combining a process identifier with the linear address to form an adjusted-linear address if the actual global/non-global value specifies that a data block referenced by the linear address is shared among a plurality of processes;
    comparing at least one of the adjusted-linear address and the linear address with a first portion of a tag of the particular one of the at least one cache line indexed; and
    if at least one of the adjusted-linear address and the linear address matches the first portion of the tag, comparing a second portion of the tag with a first physical address generated by translating the linear address.

25. The method of claim 24, further comprising,
    transmitting a data block within the particular one of the at least one cache line to a processor if at least one of the adjusted-linear address and the linear address matches the first portion of the tag and the second portion of the tag matches the first physical address.

26. The method of claim 24, further comprising,
    replacing a data block within a particular one of the at least one cache line that is selected by a replacement policy with a data block from a storage device as specified by the first physical address if at least one of the adjusted-linear address and the linear address does not match the first portion of the tag, and the first physical address does not match the second portion of the tag,
    wherein the first portion of the tag is at least one of the adjusted-linear address and the linear address, and the second portion of the tag is a second physical address of the data block from the storage device.

27. The method of claim 24, wherein the actual global/non-global value is obtained from at least one of a directory entry, specified by the linear address, of a page directory, and a page-table entry, specified by the linear address, of a page table.

28. The method of claim 24, wherein combining the process identifier with the linear address includes hashing together the process identifier with the linear address or concatenating together the process identifier with the linear address.

29. The method of claim 28, wherein at least one of the process identifier is a portion of the process identifier, and the linear address is a portion of the linear address.

30. The method of claim 24, wherein at least one of a portion of the adjusted-linear address and a portion of the linear address is compared with the first portion of the tag.

* * * * *

UNITED STATES PATENT AND TRADEMARK OFFICE
CERTIFICATE OF CORRECTION

PATENT NO.     : 6,560,690 B2
DATED          : May 6, 2003
INVENTOR(S)    : Herbert H.J. Hum et al.

It is certified that error appears in the above-identified patent and that said Letters Patent is hereby corrected as shown below:

<u>Title page,</u>
Item [75], Inventors, "Deborrah Marr" should be -- Deborah Marr --

Signed and Sealed this

Eighteenth Day of November, 2003

JAMES E. ROGAN
*Director of the United States Patent and Trademark Office*